(12) United States Patent
Wu et al.

(10) Patent No.: US 8,483,178 B2
(45) Date of Patent: Jul. 9, 2013

(54) RESOURCE ADMISSION CONTROL METHOD AND NETWORK APPARATUS

(75) Inventors: Qin Wu, Shenzhen (CN); Zhingang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 301 days.

(21) Appl. No.: 12/832,551

(22) Filed: Jul. 8, 2010

(65) Prior Publication Data

US 2010/0271943 A1 Oct. 28, 2010

Related U.S. Application Data

(63) Continuation of application No. PCT/CN2009/070089, filed on Jan. 9, 2009.

(30) Foreign Application Priority Data

Jan. 9, 2008 (CN) .......................... 2008 1 0002709

(51) Int. Cl.
*H04W 4/00* (2009.01)

(52) U.S. Cl.
USPC ........... 370/331; 370/230; 370/329; 370/401; 455/436

(58) Field of Classification Search
None
See application file for complete search history.

(56) References Cited

U.S. PATENT DOCUMENTS

| | | | |
|---|---|---|---|
| 2004/0174865 A1 | 9/2004 | O'Neill | |
| 2006/0182060 A1* | 8/2006 | Lin et al. | 370/331 |
| 2007/0248106 A1 | 10/2007 | Liu | |

FOREIGN PATENT DOCUMENTS

| | | |
|---|---|---|
| CN | 1832448 | 9/2006 |
| CN | 1956379 | 5/2007 |
| WO | WO 2005/027563 | 3/2005 |
| WO | 2007/025449 | 8/2007 |

OTHER PUBLICATIONS

Chinese Office Action mailed Aug. 10, 2011 issued in corresponding Chinese Patent Application No. 200810002709.X.
Communication Pursuant to Article 94(3) EPC, mailed Dec. 8, 2011, in corresponding European Application No. 09701567.1 (6 pp.).
*Series Y: Global Information Infrastructure, Internet Protocol Aspects and Next-Generation Networks, Next Generation Networks—Quality of Service and Performance*, ITU-T, Y.2111 (Sep. 2006), pp. 1-80.
*Telecommunications and Internet Converged Services and Protocols for Advanced Networking (TISPAN); Resource and Admission Control Sub-system (RACS); Function Architecture; Release 2*, ETSI RES 282 003 V0.8.9 (Oct. 2007), pp. 1-144.
Vidal, I. et al., *Adaptive Quality of Service Management for Next Generation Residential Gateways*, Unversidad Carlos III de Madrid, pp. 1-194.

(Continued)

*Primary Examiner* — Ayaz Sheikh
*Assistant Examiner* — Nicholas Sloms
(74) *Attorney, Agent, or Firm* — Staas & Halsey LLP

(57) ABSTRACT

A resource admission control method provided includes: an NACF receives an authentication request sent by a mobile UE when the mobile UE is moving, and sends a service request to an RACF to trigger the RACF to enforce resource admission control on a transport network. Alternatively, the method includes: a network apparatus in a transport network receives a service access request sent by a mobile UE when the mobile UE is moving, and sends a service request to an RACF to trigger the RACF to enforce resource admission control on the transport network.

1 Claim, 15 Drawing Sheets

OTHER PUBLICATIONS

Supplementary European Search Report, mailed Nov. 15, 2010, in corresponding European Application No. 09701567.

*Digital Cellular Telecommunications System (Phase 2+); Universal Mobile Telecommunications System (UMTS); IP Multimedia Subsystem (IMS); Stage 2 (3GPP TS 23.228 Version 7.9.0 Release 7)*, ETSI TS 123 228 V7.9.0, Oct. 2010 (pp. 1-226).

European Office Action issued Sep. 21, 2012 in corresponding European Patent Application No. 09701567.1.

*Output—Draft Recommendation Y.RACF (Y2111) Release 2 (Version 0.4.0)*, ITU—Telecommunication Standardization Sector, Study Period 2005-2008, NGN GSI Rapporteur Group Meeting: Beijing, Sep. 10-21, 2007, pp. 1-116.

*Baseline texts of drafting Q.nacf.mob0-NACF signaling requirements and architecture supporting nomadism*, ITU—Telecommunication Standardization Sector, Study Period 2005-2008, NGN GSI Rapporteur Group Meeting: Switzerland, Sep. 11-21, 2007, pp. 1-13.

International Search Report, mailed Apr. 9, 2009, in corresponding International Application No. PCT/CN2009/070089.

* cited by examiner

RESOURCE ADMISSION CONTROL METHOD AND NETWORK APPARATUS

CROSS-REFERENCE TO RELATED APPLICATIONS

This application is a continuation of International Application No, PCT/CN2009/070089, filed on Jan. 9, 2009, which claims priority to Chinese Patent Application No. 200810002709.X, filed on Jan. 9, 2008, both of which are hereby incorporated by reference in their entireties.

FIELD OF THE INVENTION

The present invention relates to communication technologies, and in particular, to a resource admission control method and a network apparatus.

BACKGROUND

In a Next Generation Network (NGN), service control is separated from the transport function, and a concept of resource admission control is introduced to ensure Quality of Service (QoS) of a service. A Resource and Admission Control Function (RACF) is located on the transport control layer between the service control layer and the transport bearer layer, as shown in FIG. 1. Through resource admission control, the details of the transport network are shielded from the service control layer, service control can be separated from the transport function, and the state of using resources of the transport network can be perceived downward. Through admission and resource control, the transport network resources can be utilized appropriately, the QoS of the service can be ensured, and theft of bandwidth and services can be prevented.

A resource admission control method that supports mobility is provided in the prior art. As shown in FIG. 2, the method includes:

Step 201: Before a mobile user moves to the current access network, a deregistration request is sent to a Service Control Function (SCF) at the application service layer.

Step 202: After receiving the deregistration request from the mobile user, the SCF sends a resource release request to RACF1 in the previous access network to which the mobile user attaches before handover, requesting to release resources in the previous transport network before handover of the mobile user.

Step 203: RACF1 releases resources of the previous transport network before the handover of mobile user.

Step 204: The mobile user moves to the current access network and then sends a registration request to the SCF.

Step 205: The SCF sends a service request to RACF2 in the current access network. The service request carries network resource parameters of the mobile UE, for example, QoS parameter.

Step 206: According to the network resource parameters of the mobile UE, RACF2 allocates resources to the transport network to which the mobile UE currently attaches.

In the process of researching and practicing the prior art, the inventor of the present invention finds at least the following problems in the prior art:

1. In the prior art, after the mobile user is authenticated, a request for accessing the SCF service is initiated from the mobile user side, and the SCF triggers the resource admission control, which slows down the resource allocation and release.

2. In the prior art, after the mobile user handover to another network, the SCF sends a service request to RACF2, and RACF2 enforces the corresponding policy on the current access network. Therefore, the QoS of the service is not ensured during the handover process, and therefore the continuity of a session can not ensured.

SUMMARY

The embodiments of the present invention provide a resource admission control method and a network apparatus to speed up resource allocation.

A resource admission control method provided in an embodiment of the present invention comprises:

by a Network Attachment Control Function (NACF), receiving an authentication request sent from mobile User Equipment (UE) when the mobile UE is moving around, and sending a service request to a RACF to trigger the RACF to enforce resource admission control on a transport network.

A resource admission control method provided in another embodiment of the present invention includes:

by a network apparatus in a transport network, receiving a service access request sent by a mobile UE when the mobile UE is moving around, and sending a service request to a RACF to trigger the RACF to enforce resource admission control on the transport network.

A resource admission control method provided in another embodiment of the present invention includes:

by a Proxy Call Service Control Function Entity (P-CSC-FE), receiving a service access request sent by a mobile UE when the mobile UE is moving around, and sending a service request to a RACF to trigger the RACF to enforce resource admission control on a transport network.

A resource admission control method provided in another embodiment of the present invention includes:

obtaining network resource parameters of a mobile UE from a RACF in the previous transport network before handover of the mobile user; and enforcing resource admission control on the previous transport network according to the obtained network resource parameters of the mobile UE.

A network attachment control apparatus provided in an embodiment of the present invention includes:

an authentication request receiving unit, configured to receive an authentication request sent by a mobile UE; and a message sending unit, configured to send service request related information after receiving the authentication request from the mobile UE, where the service request related information triggers a RACF to enforce resource admission control on a transport network.

A network apparatus in a transport network includes:

a service access request receiving unit, configured to receive a service access request sent by a mobile UE; and a message sending unit, configured to send a service request to a RACF after receiving the service access request to trigger the RACF to enforce resource admission control on the transport network.

A network apparatus provided in an embodiment of the present invention includes a P-CSC-FE. The P-CSC-FE includes:

a service access request receiving unit, configured to receive a service access request sent by a mobile UE; and a message sending unit, configured to send a service request to a RACF after receiving the service access request to trigger the RACF to enforce resource admission control on the transport network.

A resource admission control apparatus provided in an embodiment of the present invention includes:

a network parameter obtaining unit, configured to obtain network resource parameters of a mobile UE from a RACF in the previous access network before handover; and an enforcing unit, configured to enforce resource admission control on the current after-handover transport network according to the obtained network resource parameters of the mobile UE.

A network system provided in an embodiment of the present invention includes:

an NACF, configured to send a resource admission control trigger message to a network resource parameter management element after receiving an authentication request sent by a mobile UE in a moving process;

the network resource parameter management element, configured to send a service request to a RACF after receiving the resource admission control trigger message; and the RACF, configured to enforce resource admission control on the transport network after receiving the service request.

A network system provided in an embodiment of the present invention includes:

a home NACF, configured to send a service request to a RACF after receiving an authentication request sent by a mobile UE in a moving process; and the RACF, configured to enforce resource admission control on the transport network after receiving the service request.

A technical solution under the present invention brings the following benefits:

After receiving an authentication request sent by the mobile UE, the network sends a service request to the RACF to correlate mobile user authentication with resource admission control. Therefore, when the mobile UE accesses the network, the network perceives the access of the mobile UE by receiving the authentication request from the mobile UE, and sends a service request to the RACF automatically to trigger the RACF to enforce resource admission control on the transport network, thus speeding up the resource allocation.

Another technical solution under the present invention brings the following benefits:

After receiving a service access request sent by a mobile UE, the transport network in an embodiment of the present invention triggers a RACF to enforce resource admission control on the transport network, without involvement of SCF. at the application layer. The transport network triggers the RACF to enforce resource admission control directly, thus improving the efficiency of resource admission control.

Another technical solution under the present invention brings the following benefits:

After receiving a service request from a mobile UE, the P-CSC-FE in an embodiment of the present invention triggers a RACF to enforce resource admission control on the transport network. Compared with the prior art, the embodiment of the present invention optimizes the application layer trigger mechanism. In the service requesting process, the P-CSC-FE intercepts the service request and triggers the RACF to enforce resource admission control on the transport network. By contrast, in the prior art, a Serving Call Session Control Functional Entity (S-CSC-FE) in the SCF triggers the corresponding resource admission control after receiving the service request. Therefore, the embodiment of the present invention optimizes the application layer trigger mechanism provided in the prior art.

Another technical solution under the present invention brings the following benefits:

When the mobile UE hands over in a local domain, the embodiment of the present invention obtains the network resource parameters of the mobile UE from the RACF of the before-handover access network and allocates resources for the after-handover transport network. In the prior art, the RACF of the before-handover access network needs to release the corresponding transport network resources first, and then the target RACF enforces resource admission control on the current transport network. By contrast, the embodiment of the present invention obtains the network resource parameters of the mobile UE from the RACF of the before-handover access network directly, and then allocates resources to the after-handover transport network, thus avoiding the complicated process of resource admission control enforced by the network in the moving process of the mobile UE.

DETAILED DESCRIPTION OF THE EMBODIMENTS

Figure 1:
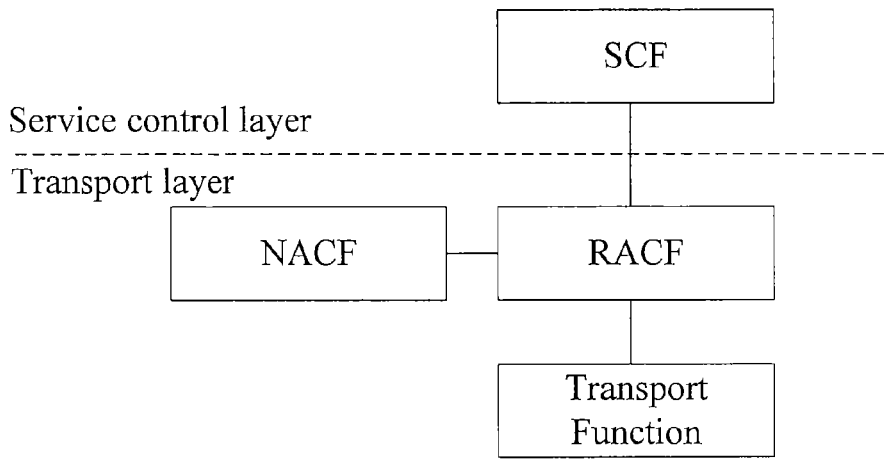
FIG. 1 shows location of a RACF in the prior art.
Figure 2:
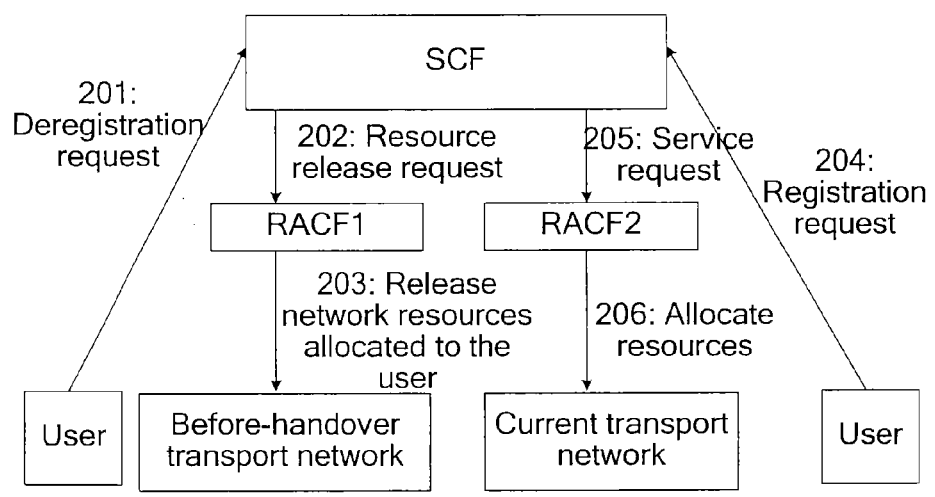
FIG. 2 shows a resource admission control method that supports mobility in the prior art.
Figure 3:
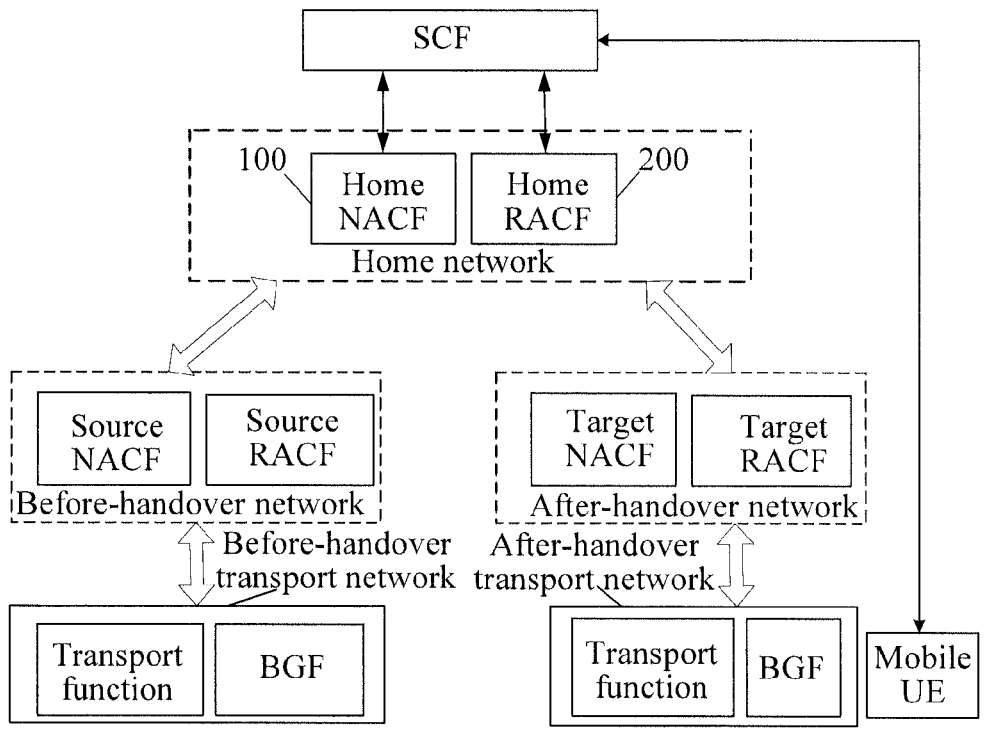
FIG. 3 shows resource admission control enforced when a mobile UE is roaming in an embodiment of the present invention.

FIG. 3 shows resource admission control enforced when a mobile UE is roaming. The resource admission control methods provided in the embodiments of the present invention are applicable to such a roaming scenario. In such a scenario, the interface between a home Network Attachment Control Function (NACF) 100 and a foreign NACF may be an interface between Transport Location Management Function Entities (TLM-FEs), namely, an interface between a local Home Agent (HA) and a home network HA; or may be an interface between Transport Authorization Authentication Function Entities (TAA-FEs), namely, an interface between an Authentication Authorization Accounting (AAA) agent and an AAA server. The interface between the home RACF 200 and the foreign RACF may be an interface between Policy Decision Function Entities (PD-FEs). The resource admission control method provided in an embodiment of the present invention is described below in three aspects based on the foregoing scenario:

1. Resource admission control enforced when the mobile UE joins the service for the first time;
2. resource admission control enforced when the mobile UE is moving; and
3. resource admission control enforced when the mobile UE leaves the service.

Figure 4:
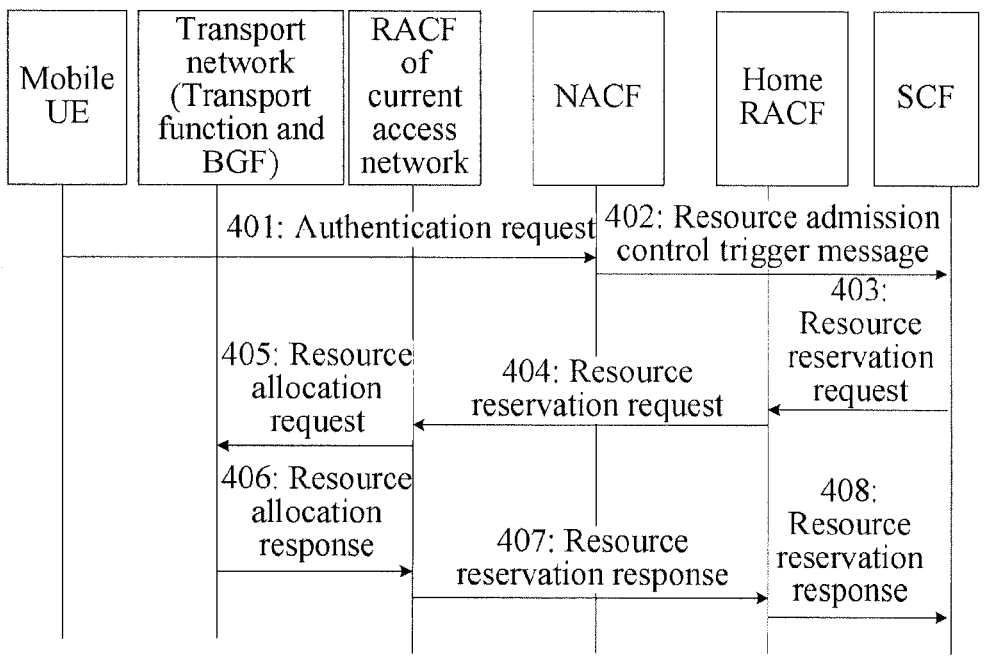
FIG. 4 is a flowchart of a resource admission control method used when a mobile UE joins the service for the first time in Embodiment 1 of the present invention.

FIG. 4 is a flowchart of a resource admission control method used when a mobile UE joins the service for the first time in Embodiment 1 of the present invention. In this embodiment, the mobile UE requests to access the service through an interface between RACFs, and an access network is the access network which the mobile UE joins the service for the first time. The resource admission control method includes the following steps:

Step 401: The mobile UE sends an authentication request to the NACF. The authentication request carries options of a service access request from the mobile user.

Step 402: The NACF sends a resource admission control trigger message to the SCF. In this way, on the network side, the NACF triggers the SCF to send a resource reservation request.

Step 403: The SCF sends a resource reservation request to the home RACF. The resource reservation request carries network resource parameters of the mobile UE.

Step 404: The home RACF sends a resource reservation request to the RACF in the current access network through an inter-domain RACF interface. The resource reservation request carries network resource parameters of the mobile UE. The inter-domain RACF interface may be an interface between PD-FEs.

Step 405: The RACF of the current access network sends a resource allocation request to the transport network to which the mobile UE currently attaches. The transport network in this step includes a transport function and a Border Gateway Function (BGF).

Step 406: The current transport network sends a resource allocation response to the RACF of the current access network.

Step 407: The RACF of the current access network sends a resource reservation response to the home RACF.

Step 408: The home RACF sends a resource reservation response to the SCF.

Figure 5:
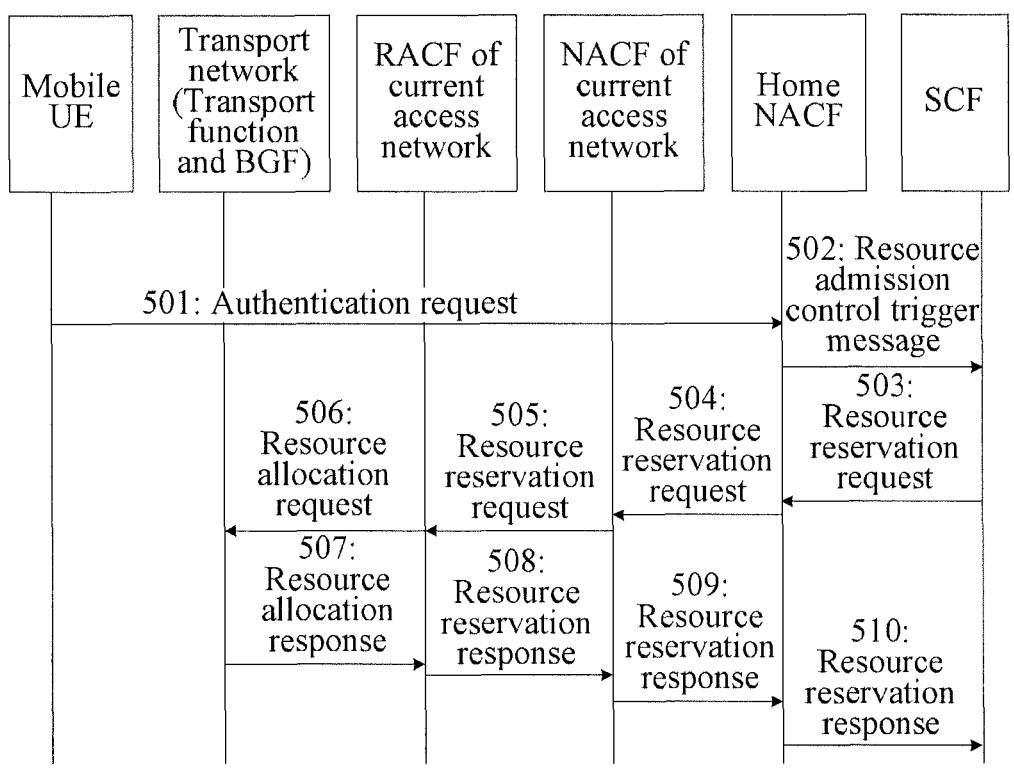
FIG. 5 is a flowchart of a resource admission control method used when a mobile UE joins the service for the first time in Embodiment 2 of the present invention.

FIG. 5 is a flowchart of a resource admission control method used when a mobile UE joins the service for the first time in Embodiment 2 of the present invention. In this embodiment, the mobile UE requests to access the service through an interface between NACFs, and the access network when the mobile UE joins the service for the first time is the access network to which the mobile UE currently attaches The resource admission control method includes the following steps:

Step 501: The mobile UE sends an authentication request to the home NACF. The authentication request carries an option about the mobile user joining a service.

Step 502: The home NACF sends a resource admission control trigger message to the SCF. In this way, on the network side, the NACF triggers the SCF to send a resource reservation request.

Step 503: The SCF sends a resource reservation request to the home NACF. The resource reservation request carries network resource parameters of the mobile UE.

Step 504: The home NACF sends a resource reservation request to the NACF in the current access network through an inter-domain interface between NACFs. The resource reservation request carries network resource parameters of the mobile UE. The interface between NACFs may be an interface between TLM-FEs, or an interface between TAA-FEs.

Step 505: The NACF of the current access network sends a resource reservation request to the RACF of the current access network.

Step 506: The RACF of the current access network sends a resource allocation request to the transport network to which the mobile UE currently attaches. The transport network in this step includes a transport function and a BGF.

Step 507: The current transport network sends a resource allocation response to the RACF of the current access network.

Step 508: The RACF of the current access network sends a resource reservation response to the NACF of the current access network.

Step 509: The NACF of the current access network sends a resource reservation response to the home NACF.

Step 510: The home NACF sends a resource reservation response to the SCF.

Figure 6:
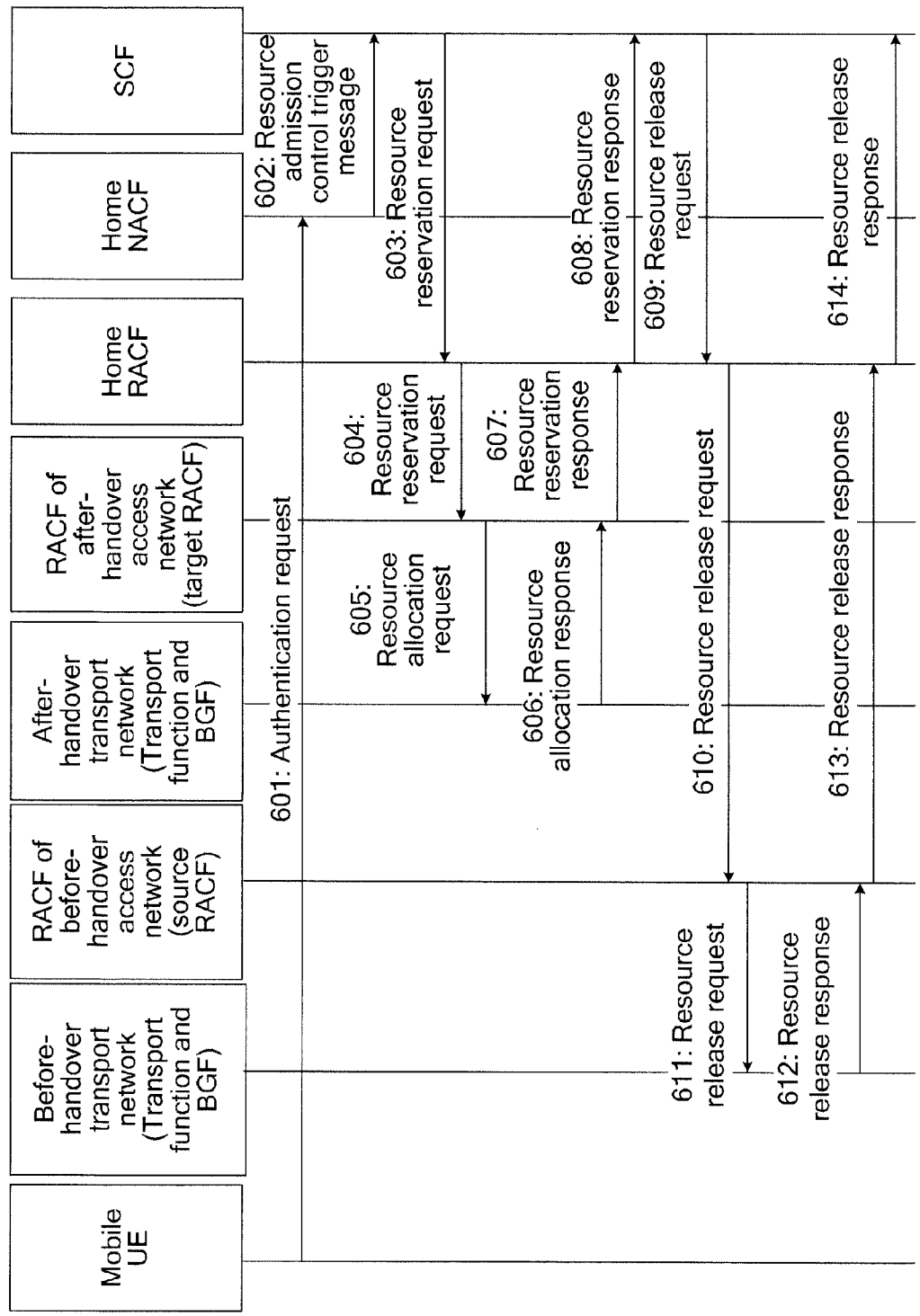
FIG. 6 is a flowchart of a resource admission control method used in a handover process of a mobile UE in Embodiment 3 of the present invention.

FIG. 6 is a flowchart of a resource admission control method used in a handover process of a mobile UE in Embodiment 3 of the present invention. In this method, the SCF controls resource admission through an interface between RACFs, and the access network to which the mobile UE attaches after handover is the access network to which the mobile UE currently attaches. The resource admission control method includes the following steps:

Step 601: The mobile UE sends an authentication request to the home NACF.

Step 602: The home NACF sends a resource admission control trigger message to the SCF. In this way, on the network side, the NACF triggers the SCF to send a resource reservation request.

Step 603: The SCF sends a resource reservation request to the home RACF. The resource reservation request carries network resource parameters of the mobile UE.

Step 604: Through an inter-domain RACF interface, the home RACF sends a resource reservation request to the target RACF in the access network to which the mobile UE currently attaches after handover.

Step 605: The target RACF sends a resource allocation request to the current transport network. The transport network in this step includes a transport function and a BGF.

Step 606: The current transport network sends a resource allocation response to the target RACF of the current access network.

Step 607: The target RACF sends a resource reservation response to the home RACE Step 608: The home RACF sends a resource reservation response to the SCF.

Step 609: The SCF sends a resource release request to the home RACF.

Step 610: Through an inter-domain RACF interface, the home RACF sends a resource release request to the source RACF in the access network to which the mobile UE attaches before handover.

Step 611: The source RACF sends a resource release request to the before-handover transport network. The transport network in this step includes a transport function and a BGF.

Step 612: The previous transport network before the handover of the mobile UE sends a resource release response to the source RACF in the previous access network.

Step 613: The source RACF sends a resource release response to the home RACF in the home network.

Step 614: The home RACF sends a resource release response to the SCF.

Figure 7:
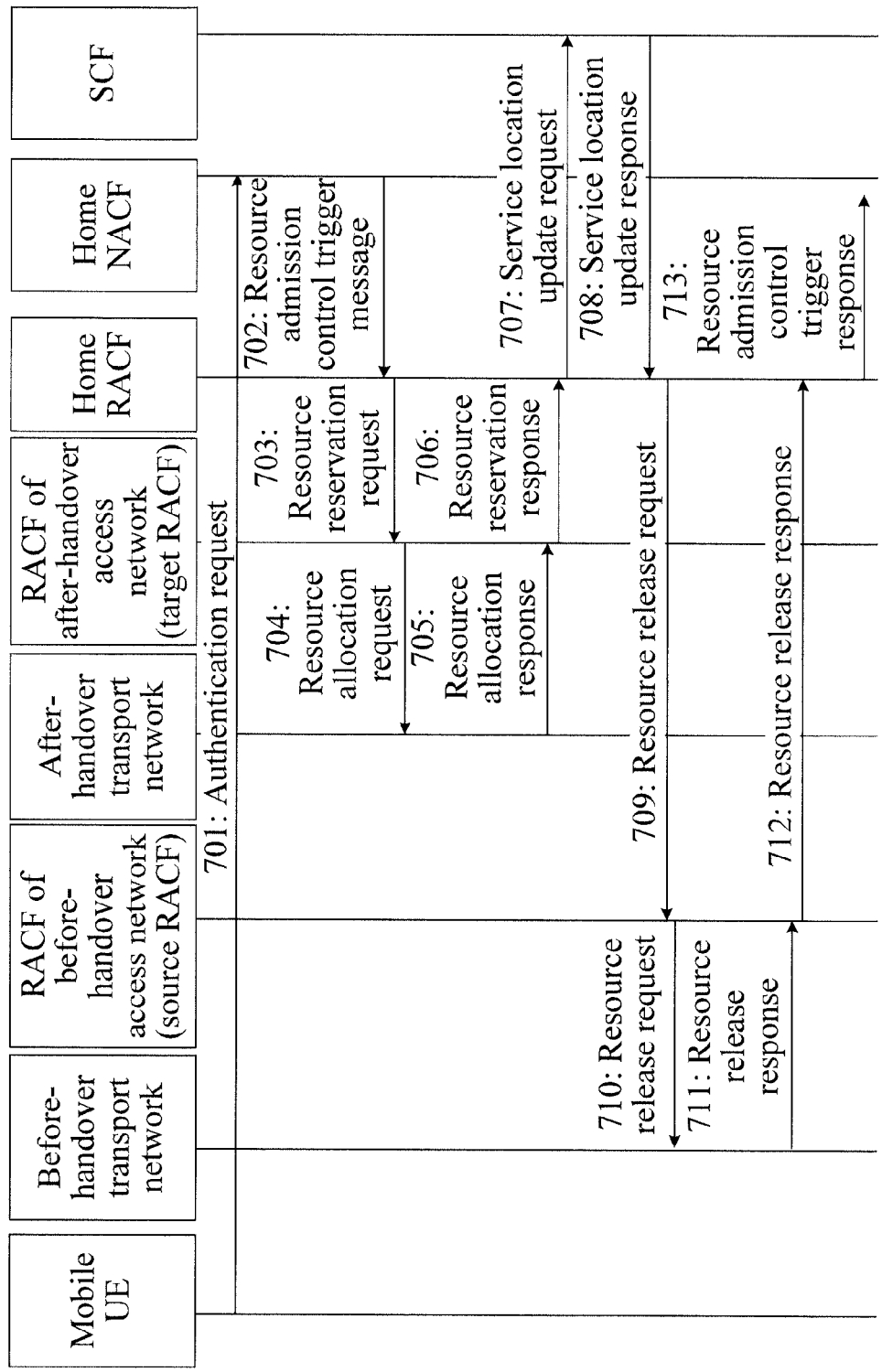
FIG. 7 is a flowchart of a resource admission control method used in a handover process of a mobile UE in Embodiment 4 of the present invention.

FIG. 7 is a flowchart of a resource admission control method used in a handover process of a mobile UE in Embodiment 4 of the present invention. In this method, the home RACF controls resource admission through an interface between RACFs, and the access network to which the mobile UE attaches after handover is the access network to which the mobile UE currently attaches.

The resource admission control method includes the following steps:

Step 701: The mobile UE sends an authentication request to the NACF. The NACF may be a target NACF in the access network after handover of the mobile UE, or a home NACF in the home network.

Step 702: If the NACF is a home NACF, the home NACF sends a resource admission control trigger message to the home RACF. In this way, on the network side, the home NACF triggers the home RACF to send a resource reservation request. If the NACF is a target NACF, the target NACF sends a resource admission control triggering message to the home RACF through the target, RACF. In this way, on the network side, the target NACF triggers the home RACF to send a resource reservation request.

Step 703: The home RACF sends a resource reservation request to the target RACF of the after-handover access network.

Step 704: The target RACF sends a resource allocation request to the current transport network. The transport network in this step includes a transport function and a BGF.

Step 705: The current transport network sends a resource allocation response to the target RACF of the current access network.

Step 706: The target RACF sends a resource reservation response to the home RACF.

Step 707: The home RACF sends a service location update request to the SCF. The service location update request carries an indication that the mobile UE has handed over to the current transport network.

Step 708: The SCF sends a service location update response to the home RACF.

Step 709: Through an inter-domain RACF interface, the home RACF sends a resource release request to the source RACF in the access network to which the mobile UE attaches before handover.

Step 710: The source RACF sends a resource release request to the previous before-handover transport network. The transport network in this step includes a transport function and a BGF.

Step 711: The previous transport network before handover sends a resource release response to the source RACF of the access network before the handover.

Step 712: The source RACF sends a resource release response to the home RACF.

Step 713: The home RACF sends a resource admission control trigger response to the NACF.

Figure 8:
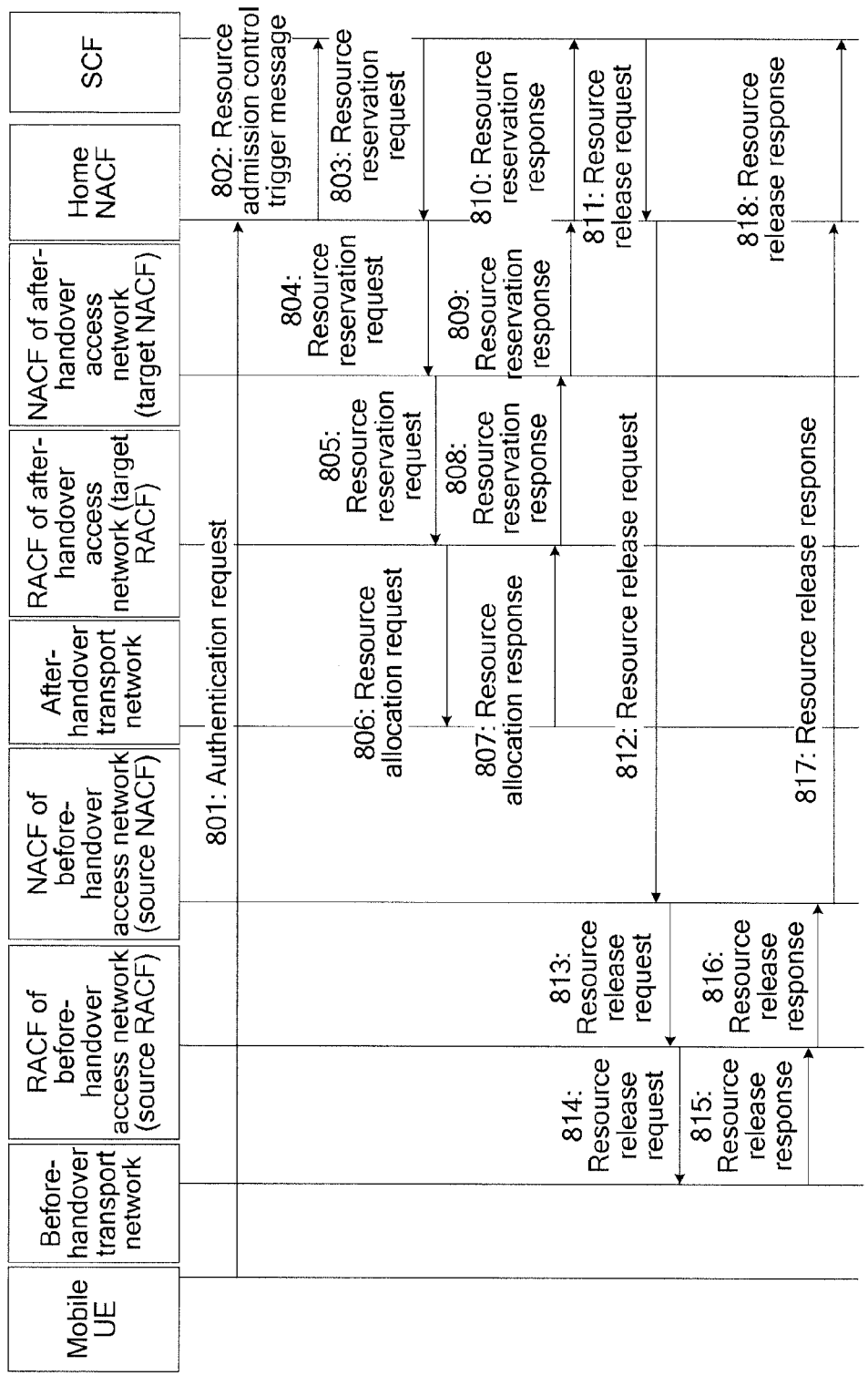
FIG. 8 is a flowchart of a resource admission control method used in a handover process of a mobile UE in Embodiment 5 of the present invention.

FIG. 8 is a flowchart of a resource admission control method used in a handover process of a mobile UE in Embodiment 5 of the present invention. In this method, the SCF controls resource admission through an interface between NACFs, and the access network to which the mobile UE attaches after handover is the access network to which currently the mobile UE attaches. The resource admission control method includes the following steps:

Step 801: The mobile UE sends an authentication request to the home NACF.

Step 802: The home NACF sends a resource admission control trigger message to the SCF.

In this way, on the network side, the NACF triggers the SCF to send a resource reservation request.

Step 803: The SCF sends a resource reservation request to the home NACF. The resource reservation request carries network resource parameters of the mobile UE.

Step 804: The home NACF sends a resource reservation request to the target NACF in the current access network after handover of the mobile UE.

Step 805: The target NACF sends a resource reservation request to the target RACF of the current access network.

Step 806: The target RACF sends a resource allocation request to the current transport network. The transport network in this step includes a transport function and a BGF.

Step 807: The current transport network sends a resource allocation response to the target RACF of the current access network.

Step 808: The target RACF of the current access network sends a resource reservation response to the target NACF.

Step 809: The target NACF sends a resource reservation response to the home NACF.

Step 810: The home NACF sends a resource reservation response to the SCF.

Step 811: The SCF sends a resource release request to the home NACF.

Step 812: The home NACF sends a resource release request to the source NACF.

Step 813: The source NACF sends a resource release request to the source RACF.

Step 814: The source RACF sends a resource release request to the previous before-handover transport network of the mobile UE. The transport network in this step includes a transport function and a BGF.

Step 815: The before-handover transport network sends a resource release response to the source RACE Step 816: The source RACF sends a resource release response to the source NACF.

Step 817: The source NACF sends a resource release response to the home NACF.

Step 818: The home NACF sends a resource release response to the SCF.

Figure 9:
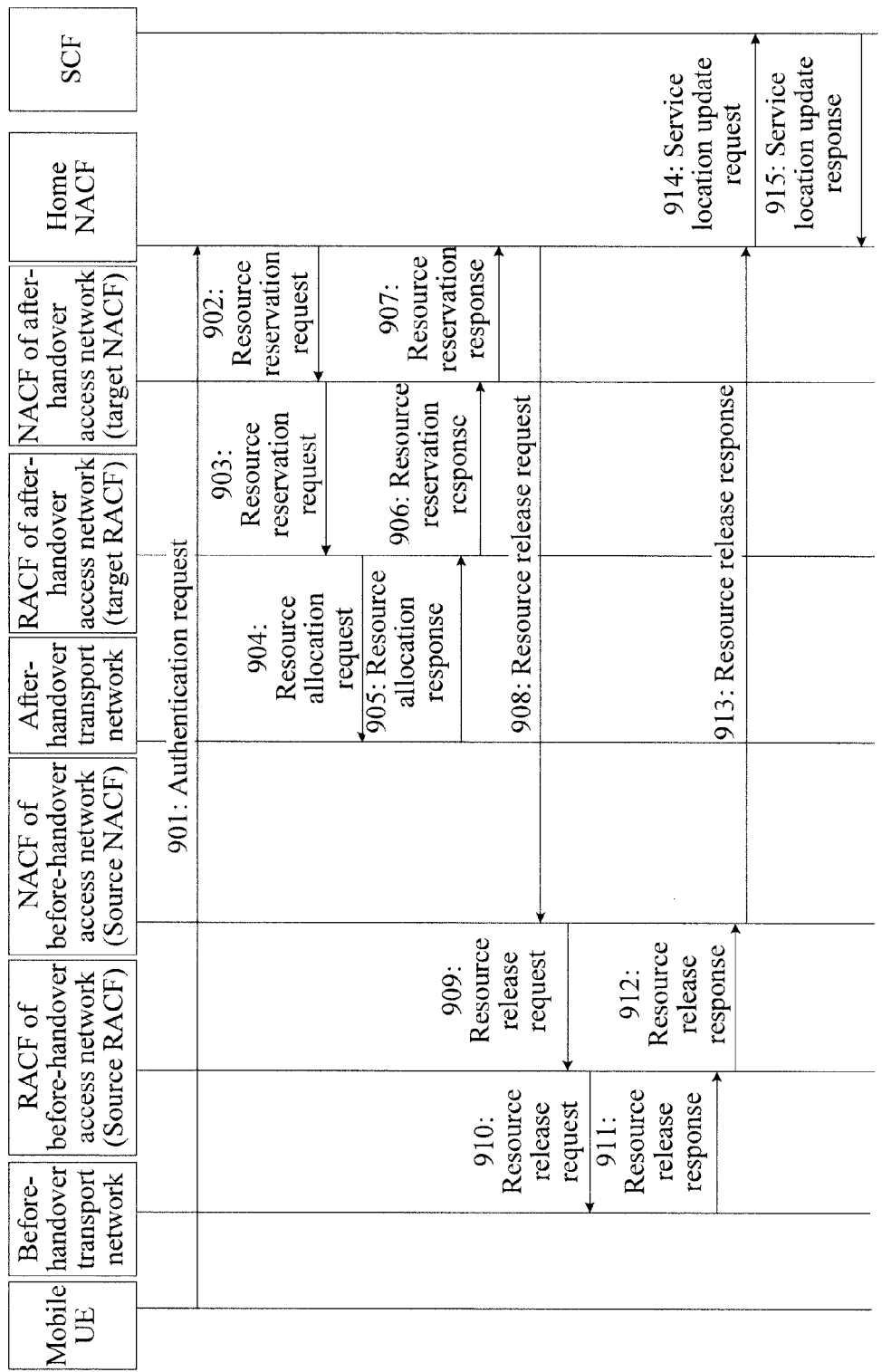
FIG. 9 is a flowchart of a resource admission control method used in a handover process of a mobile UE in Embodiment 6 of the present invention.

FIG. 9 is a flowchart of a resource admission control method used during a handover process of a mobile UE in Embodiment 6 of the present invention. In this method, the home NACF controls resource admission through an interface between NACFs, the network resource parameters of the mobile UE are stored in the home NACF, and the access network to which the mobile UE attaches after handover is the access network to which the mobile UE currently attaches. The resource admission control method includes the following steps:

Step 901: The mobile UE sends an authentication request to the home NACF.

Step 902: The home NACF sends a resource reservation request to the target RACF in the current access network after handover of the mobile UE. The resource reservation request carries network resource parameters of the mobile UE.

Step 903: The target NACF sends a resource reservation request to the target RACF.

Step 904: The target RACF sends a resource allocation request to the current transport network. The transport network in this step includes a transport function and a BGF.

Step 905: The current transport network sends a resource allocation response to the target RACF.

Step 906: The target RACF sends a resource reservation response to the target NACF.

Step 907: The target NACF sends a resource reservation response to the home NACF.

Step 908: The home NACF sends a resource release request to the source NACF.

Step 909: The source NACF sends a resource release request to the source RACF,

Step 910: The source RACF sends a resource release request to the previous before-handover transport network. The transport network in this step includes a transport function and a BGF.

Step 911: The before-handover transport network sends a resource release response to the source RACF.

Step 912: The source RACF sends a resource release response to the source NACF.

Step 913: The source NACF sends a resource release response to the home NACF.

Step 914: The home NACF sends a service location update request to the SCF. The service location update request carries an indication that the mobile UE has handed over to the current transport network.

Step 915: The SCF sends a service location update response to the home NACF.

Figure 10:
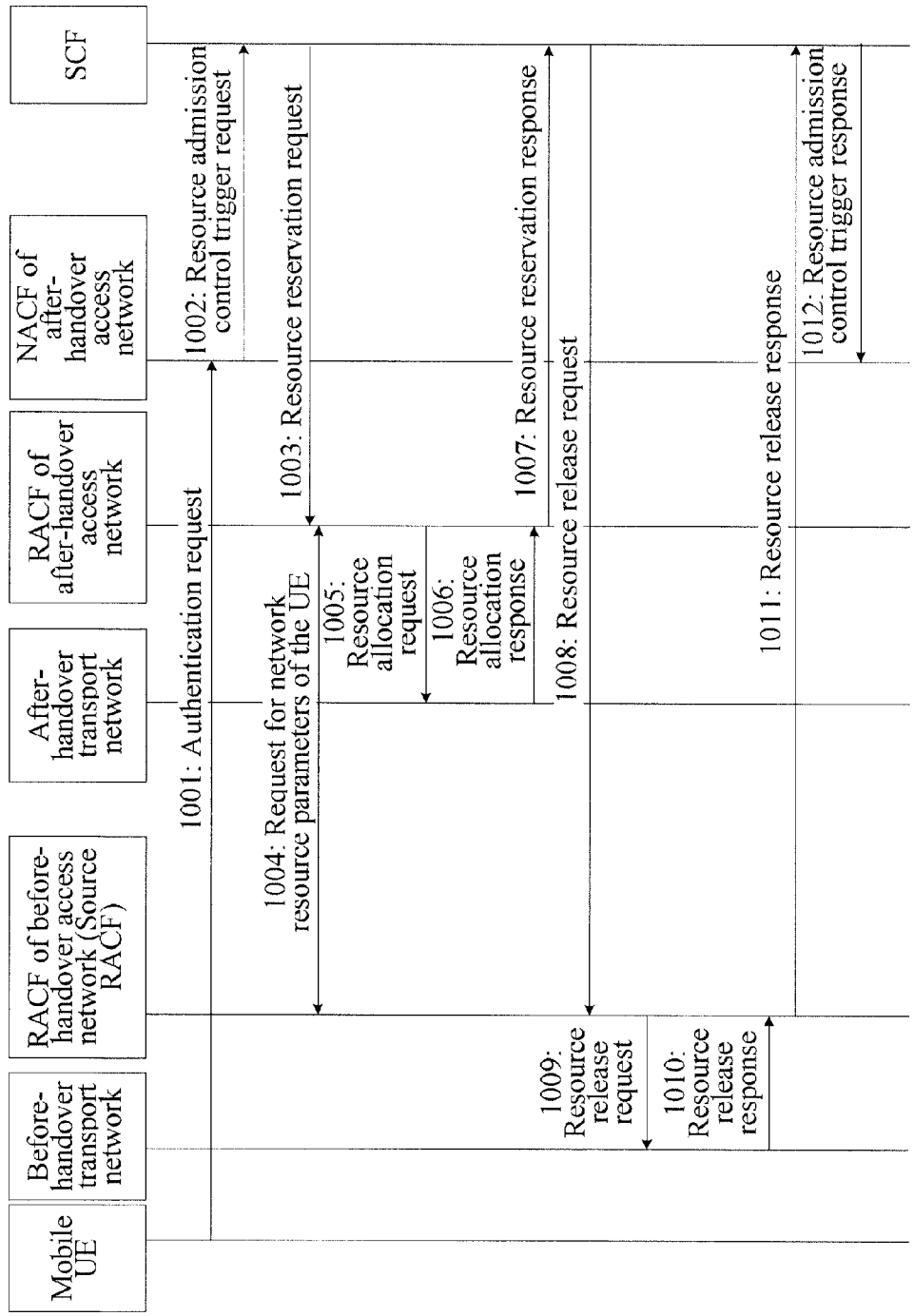
FIG. 10 is a flowchart of a resource admission control method used in a handover process of a mobile UE in Embodiment 7 of the present invention.

FIG. 10 is a flowchart of a resource admission control method used in a handover process of a mobile UE in Embodiment 7 of the present invention. In this resource admission control method, the target RACF enforces resource admission control according to the network resource parameters directly obtained from the source RACF. This method is applicable to handover of the mobile UE between local domains. Information may be exchanged between the RACF in this embodiment and the RACF in the local domain in Embodiment 8. The resource admission control method includes the following steps:

Step 1001: The mobile UE sends an authentication request to the target NACF.

Step 1002: The target NACF sends a resource admission control trigger message to the SCF. In this way, on the network side, the NACF triggers the SCF to send a resource reservation request.

Step 1003: The SCF sends a resource reservation request to the target RACF.

Step 1004: If the network resource parameters of the mobile UE are obtained from the SCF, this step is omissible. Otherwise, the target RACF requests the source RACF to provide the network resource parameters of the mobile UE corresponding to the previous before-handover access network of the mobile UE.

Step 1005: The target RACF sends a resource release request to the current transport network. The transport network in this step includes a transport function and a BGF.

Step 1006: The current transport network sends a resource allocation response to the target RACF.

Step 1007: The target RACF sends a resource reservation response to the SCF.

Step 1008: The SCF sends a resource release request to the source RACF.

Step 1009: The source RACF sends a resource release request to the previous before-handover transport network of the mobile UE. The transport network in this step includes a transport function and a BGF.

Step 1010: The before-handover transport network sends a resource release response to the source RACF.

Step 1011: The source RACF sends a resource release response to the SCE

Figure 11:
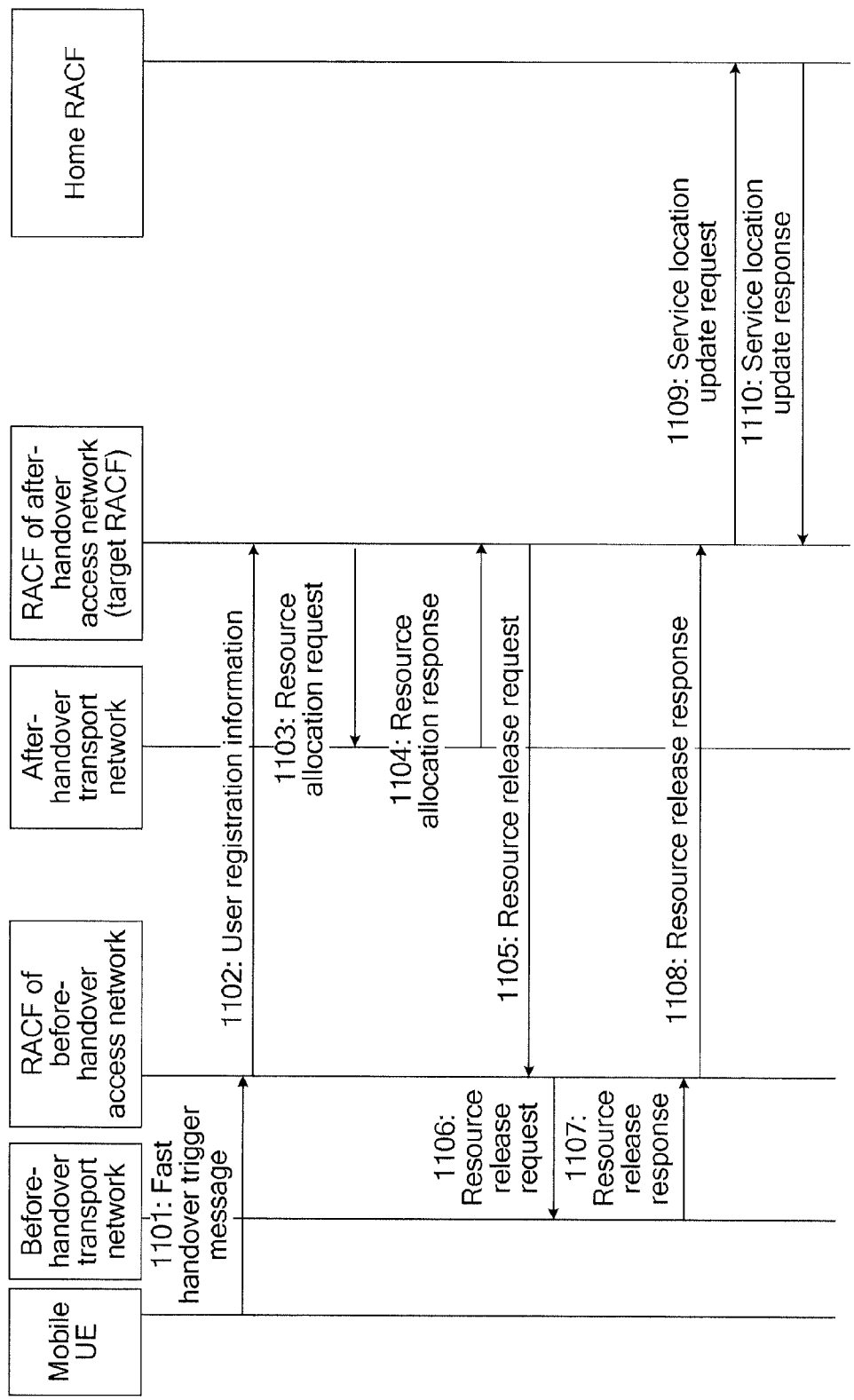
FIG. 11 is a flowchart of a resource admission control method used in a handover process of a mobile UE in Embodiment 8 of the present invention.

Step 1012: The SCF sends a resource admission control trigger response to the target NACF, FIG. 11 is a flowchart of a resource admission control method used in a handover process of a mobile UE in Embodiment 8 of the present invention. In fast handover, the target RACF passively receives the network resource parameters of the mobile UE from the source RACE. This resource admission control method is applicable to the scenario that the mobile UE is handed over between local domains. This resource admission control method includes the following steps:

Step 1101: The mobile UE sends a fast handover trigger message to the source RACF located in a before-handover access router. The message carries network resource parameters of the mobile UE.

Step 1102: The source RACF sends a user registration message to the target RACF located in a current after-handover access router. The message carries the network resource parameters of the mobile UE.

Step 1103: The target RACF sends a resource allocation request to the current after-handover transport network. The transport network in this step includes a transport function and a BGF.

Step 1104: The after-handover transport network sends a resource allocation response to the target RACF.

Step 1105: The target RACF sends a resource release request to the source RACF.

Step 1106: The source RACF sends a resource release request to the previous before-handover transport network of the mobile UE. The transport network in this step includes a transport function and a BGF.

Step 1107: The previous before-handover transport network of mobile UE sends a resource release response to the source RACF.

Step 1108: The source RACF sends a resource release response to the target RACF.

Step 1109: The target RACF sends a service location update request to the home RACF.

Step 1110: The home RACF sends a service location update response to the target RACF.

Figure 12:
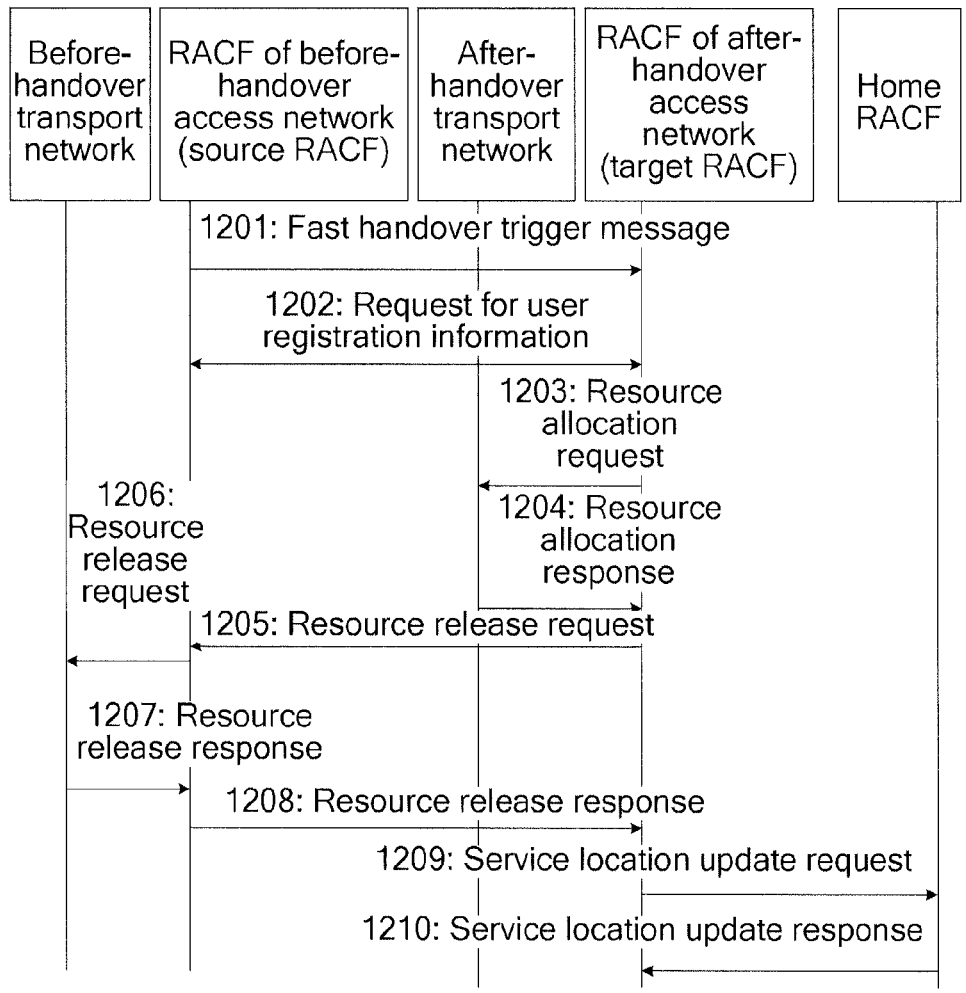
FIG. 12 is a flowchart of a resource admission control method used in a handover process of a mobile UE in Embodiment 9 of the present invention.

FIG. 12 is a flowchart of a resource admission control method used in a handover process of a mobile UE in Embodiment 9 of the present invention. In fast handover, the target RACF actively obtains the network resource parameters of the mobile UE from the source RACF. This resource admission control method is applicable to the scenario that the mobile UE is handed over between local domains. This resource admission control method includes the following steps:

Step 1201: The source RACF located in the previous access router before handover of the mobile UE sends a fast handover trigger message to the target RACF located in the current after-handover access router.

Step 1202: The target RACF sends a request for user registration information to the source RACF. The request carries network resource parameters of the mobile UE.

The details of this step are: the target RACF sends a request for user registration information to the source RACF, and the source RACF sends user registration information to the target RACF. The user registration information includes the network resource parameters of the mobile UE, or the user registration information in this step may be service context information.

Steps 1203-1210 are the same as steps 1103-1110.

Figure 13:
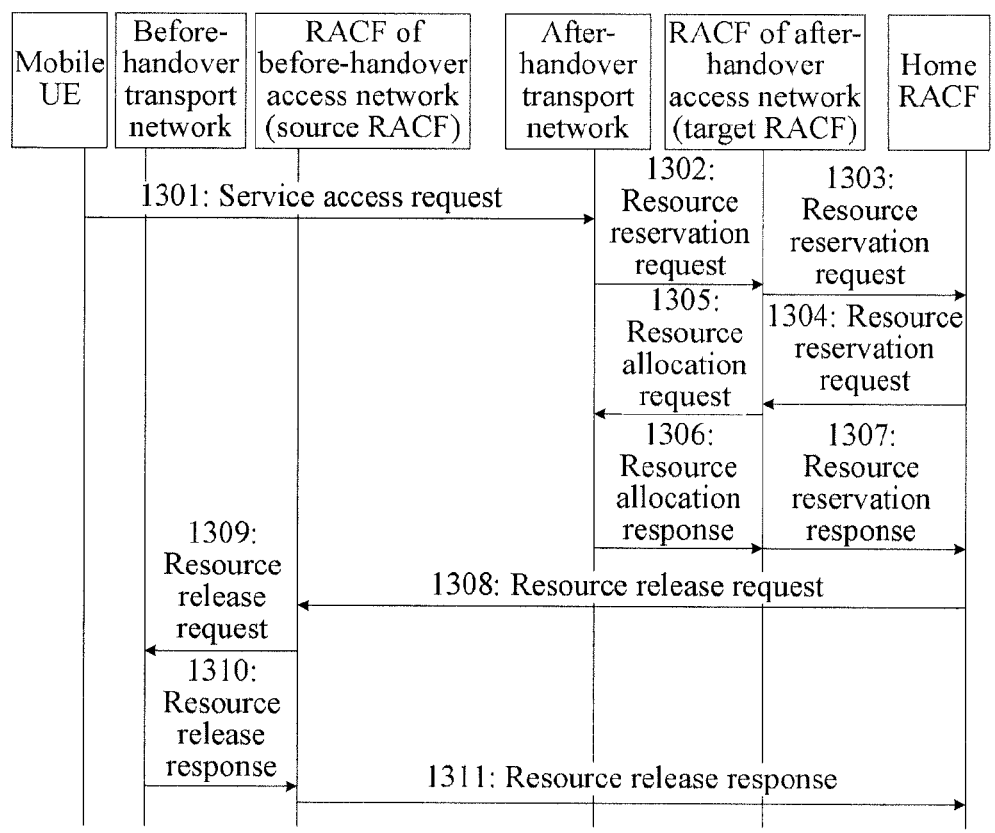
FIG. 13 is a flowchart of a resource admission control method used in a handover process of a mobile UE in Embodiment 10 of the present invention.

FIG. 13 is a flowchart of a resource admission control method used in a handover process of a mobile UE in Embodiment 10 of the present invention. The after-handover transport network (which includes a transport function and/or a BGF) triggers resource admission control, and the access network that covers the mobile UE after handover is the access network that currently covers the mobile UE. The resource admission control method includes the following steps:

Step 1301: The mobile UE sends a service access request to the current transport network after handover of the mobile UE.

Step 1302: The current transport network after handover of the mobile UE sends a resource reservation request to the target RACF.

Step 1303: The target RACF forwards the resource reservation request to the home RACF.

Step 1304: The home RACF controls the resource allocation uniformly, and sends a resource reservation request to the target RACF. The resource reservation request carries network resource parameters of the mobile UE.

Step 1305: The target RACF sends a resource allocation request to the current after-handover transport network.

Step 1306: The current after-handover transport network sends a resource allocation response to the target RACF.

Step 1307: The target RACF sends a resource reservation response to the home RACF.

Step 1308: The home RACF sends a resource release request to the source RACF.

Step 1309: The source RACF sends a resource release request to the previous transport network before handover of the mobile UE. The transport network in this step includes a transport function and/or a BGF.

Step 1310: The previous transport network before handover sends a resource release response to the source RACF.

Step 1311: The source RACF sends a resource release response to the home RACF.

An alternative practice in this embodiment is: The home RACF does not control resource allocation uniformly or send a resource reservation request that carries the network resource parameters to the target RACF, but the target RACF obtains the network resource parameters of the mobile UE from the home NACF.

Figure 14:
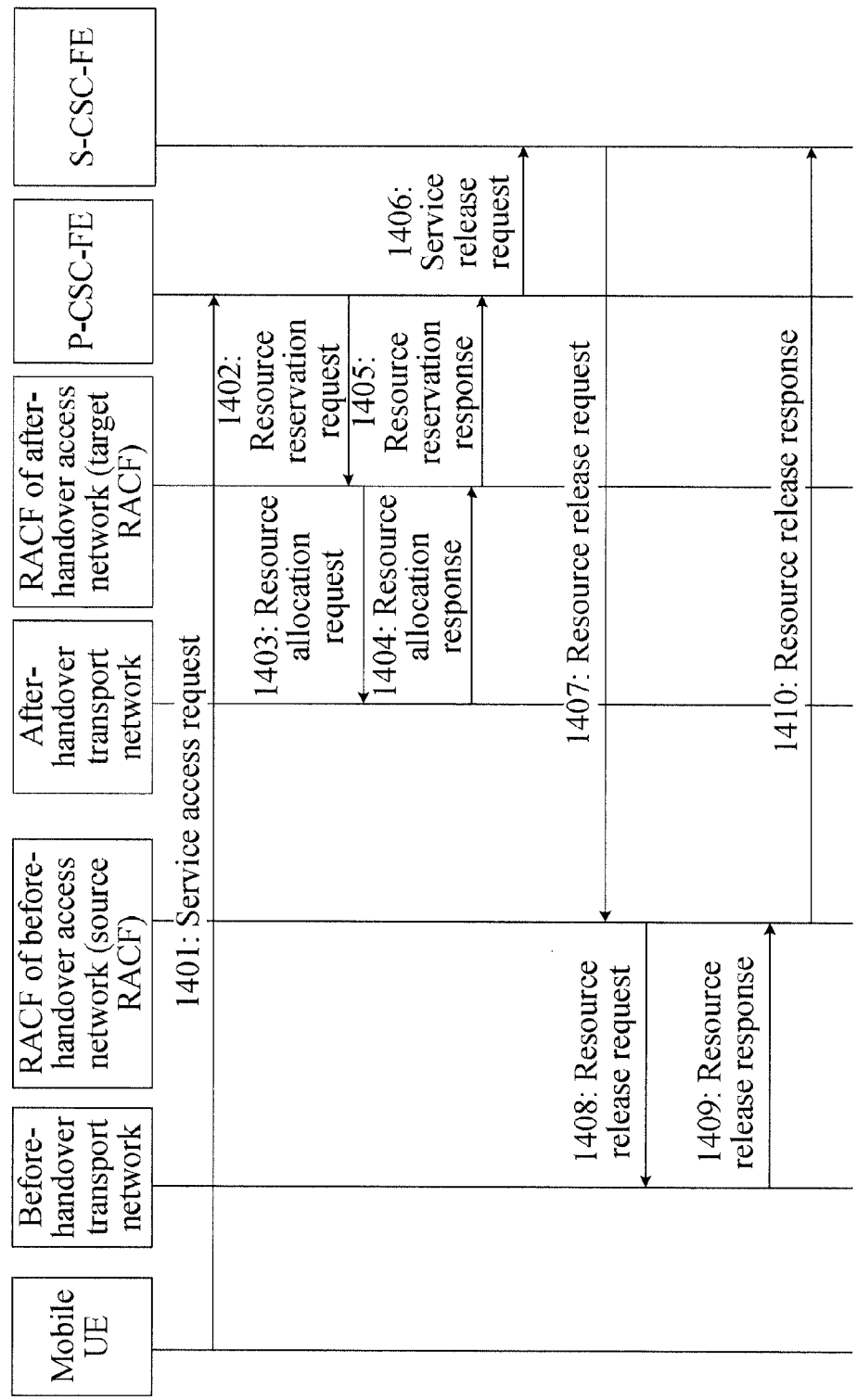
FIG. 14 is a flowchart of a resource admission control method used in a handover process of a mobile UE in Embodiment 11 of the present invention.

FIG. 14 is a flowchart of a resource admission control method used in a handover process of a mobile UE in Embodiment 11 of the present invention. A P-CSC-FE in the SCF triggers resource admission control, and the access network that covers the mobile UE after handover is the access network that currently covers the mobile UE. The resource admission control method includes the following steps:

Step 1401: The mobile UE sends a service access request to an S-CSC-FE in the SCE The request carries network resource parameters of the mobile UE.

Step 1402: The P-CSC-FE intercepts the service access request, and sends a resource reservation request to the target RACF in the access network to which the mobile UE currently attaches. The resource reservation request is a resource admission control request, and carries the network resource parameters of the mobile UE.

Step 1403: The target RACF sends a resource allocation request to the current transport network. The transport network in this step includes a transport function and/or a BGF.

Step 1404: The current transport network sends a resource allocation response to the target RACF.

Step 1405: The target RACF sends a resource reservation response to the P-CSC-FE. The resource reservation response is a resource admission control response.

Step 1406: The P-CSC-FE sends a service release request to the S-CSC-FE.

Step 1407: The S-CSC-FE sends a resource release request to the source RACF in the access network before handover of mobile UE.

Step 1408: The source RACF sends a resource release request to the previous transport network before handover. The transport network in this step includes a transport function and/or a BGF.

Step 1409: The previous transport network before handover sends a resource release response to the source RACF.

Step 1410: The source RACF sends a resource release response to the S-CSC-FE.

In this embodiment, the network resource parameters of the mobile UE are not necessarily carried in the resource reservation request sent by the mobile UE; instead, the target RACF obtains the network resource parameters from the home NACF.

Figure 15:
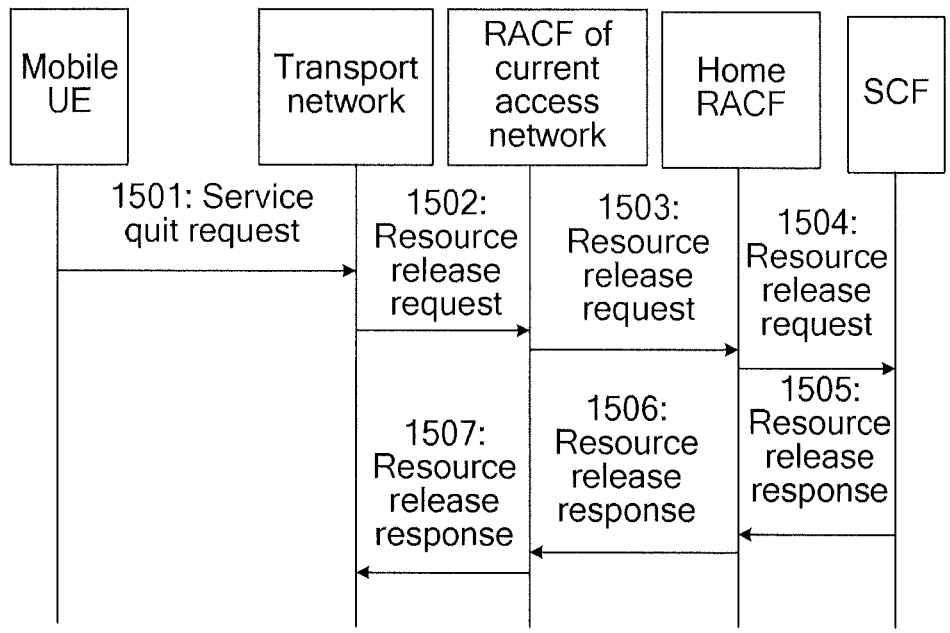
FIG. 15 is a flowchart of a resource admission control method used when a mobile UE leaves the service in Embodiment 12 of the present invention.

FIG. 15 is a flowchart of a resource admission control method used when a mobile UE leaves the service in Embodiment 12 of the present invention. A service leaving request is sent to the SCF indirectly through the transport network that covers the mobile UE. The resource admission control method includes the following steps:

Step 1501: The mobile UE sends a service leaving request to the transport network (which includes a transport function and/or a BGF), Step 1502: The transport network sends a resource release request to the RACF of the current access network.

Step 1503: The RACF of the current access network sends a resource release request to the home RACF.

Step 1504: The home RACF sends a resource release request to the SCF.

Step 1505: The SCF sends a resource release response to the home RACF.

Step 1506: The home RACF sends a resource release response to the RACF of the current access network.

Step 1507: The RACF of the current access network sends a resource release response to the transport network.

Figure 16:
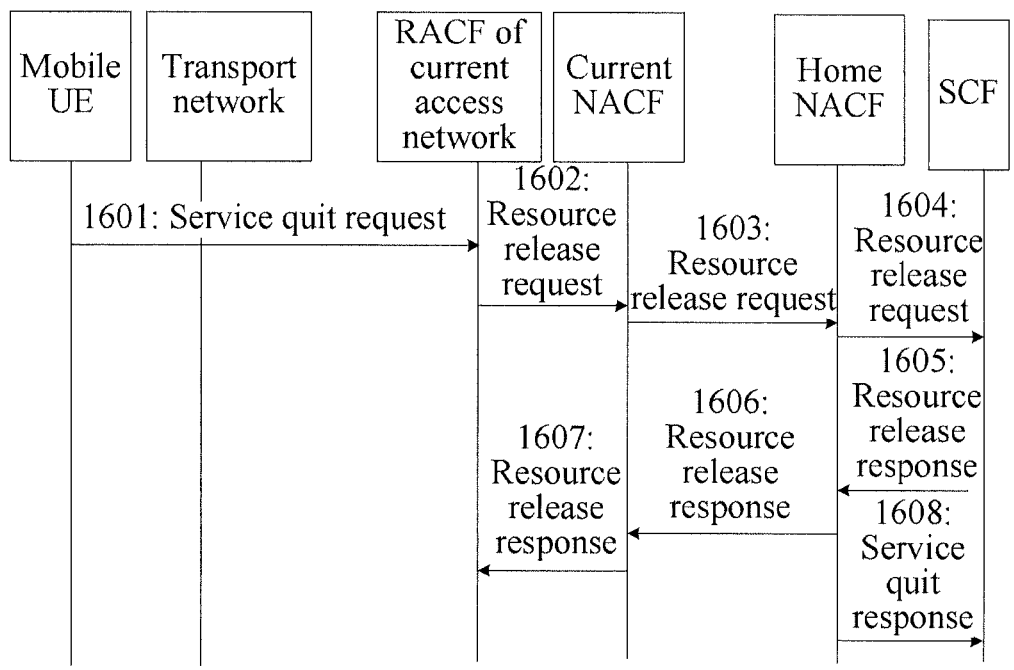
FIG. 16 is a flowchart of a resource admission control method used when a mobile UE leaves the service in Embodiment 13 of the present invention.

FIG. 16 is a flowchart of a resource admission control method used when a mobile UE leaves the service in Embodiment 13 of the present invention, in which the request for leaving the service is sent through an interface between NACFs. The resource admission control method includes the following steps:

Step 1601: The mobile UE sends a service leaving request to the RACF of the current access network through the transport network to which the mobile UE currently attaches.

Step 1602: The RACF of the current access network sends a resource release request to the NACF of the current network.

Step 1603: The NACF of the current network sends a resource release request to the home NACF.

Step 1604: The home NACF sends a resource release request to the SCF,

Step 1605: The SCF sends a resource release response to the home NACF.

Step 1606: The home NACF sends a resource release response to the NACF of the current access network.

Step 1607: The NACF of the current access network sends a resource release response to the RACF of the current access network.

Step 1608: The home NACF sends a service leaving response to the SCF.

Figure 17:
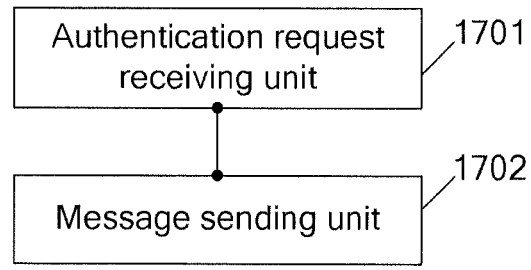
FIG. 17 shows a structure of a network attachment control apparatus provided in Embodiment 14 of the present invention.

As shown in FIG. 17, a network attachment control apparatus provided in Embodiment 14 of the present invention includes:

an authentication request receiving unit 1701, configured to receive an authentication request sent by a mobile UE; and a message sending unit 1702, configured to send service request related information after receiving the authentication request from the mobile UE, where the service request related information triggers a RACF to enforce resource admission control on a transport network.

The RACF may be a RACF of the access network that currently covers the mobile UE, or a RACF of the access network that covers the mobile UE before handover of the mobile UE.

The message sending unit 1702 includes a unit for sending a resource admission control trigger message that is configured to: send a resource admission control trigger message to the home RACF after receiving an authentication request from the mobile UE, to trigger the home RACF to send a resource reservation request to the RACF of the access network that currently covers the mobile UE or send a resource release request to the RACF of the access network that covers the mobile UE before handover.

Alternatively, the message sending unit includes a unit for sending a resource admission control trigger message that is configured to: send a resource admission control trigger message to the SCF after receiving an authentication request from the mobile UE, to trigger the SCF to send a resource reservation request to the RACF of the access network that currently covers the mobile UE or send a resource release request to the RACF of the access network that covers the mobile UE before handover.

Alternatively, the network attachment control apparatus is a home NACF of the mobile UE; and the RACF may be a RACF of the access network to which the mobile UE attaches, or a RACF of the access network to which the mobile UE attaches before handover.

The message sending unit 1702 includes:

a resource reservation request sending unit, configured to: send a resource reservation request to the NACF of the access network to which the mobile UE attaches after receiving the authentication request from the mobile UE, to trigger the NACF of the access network to which the mobile UE currently attaches to send a resource reservation request to the RACF of the access network to which the mobile UE currently attaches; and a resource release request sending unit, configured to: send a resource release request to the NACF of the access network that covers the mobile UE before handover after receiving the authentication request from the mobile UE, to trigger the NACF of the access network to which the mobile UE attaches before handover to send a resource release request to the RACF of the access network that covers the mobile UE before handover.

Figure 18:
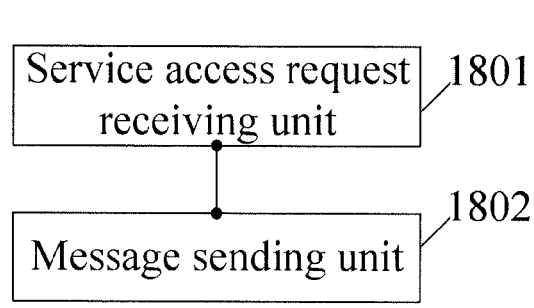
FIG. 18 shows a structure of a network apparatus provided in Embodiment 15 of the present invention.

As shown in FIG. 18, a network apparatus in a transport network in Embodiment 15 of the present invention includes:

a service access request receiving unit 1801, configured to receive a service access request sent by a mobile UE; and a message sending unit 1802, configured to send a service request to a RACF after receiving the service access request to trigger the RACF to enforce resource admission control on the transport network.

Figure 19:
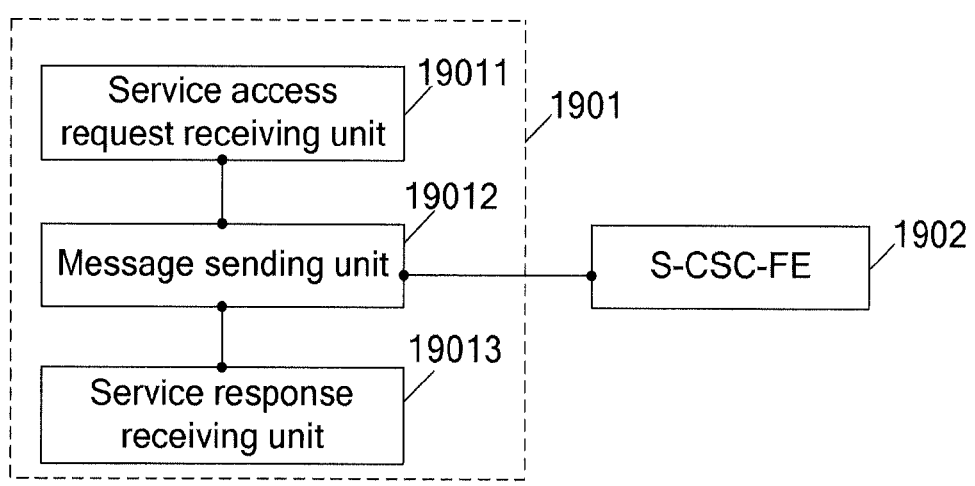
FIG. 19 shows a structure of a network apparatus provided in Embodiment 16 of the present invention.

FIG. 19 shows a structure of a network apparatus provided in Embodiment 16 of the present invention. The apparatus includes a P-CSC-FE 1901 and an S-CSC-FE 1902. The P-CSC-FE 1901 includes:

a service access request receiving unit 19011, configured to receive a service access request sent by a mobile UE; and a message sending unit 19012, configured to send a service request to a RACF after receiving the service access request to trigger the RACF to enforce resource admission control on the transport network.

The RACF may be a RACF of the access network to which the mobile UE currently attaches, or an RACF of the access network that covers the mobile UE before handover.

The message sending unit 19012 includes:

a resource reservation request sending unit, configured to send a resource reservation request to the RACF of the access network to which the mobile UE currently attaches after receiving the service access request.

The P-CSC-FE further includes:

a service response receiving unit 19013, configured to receive a service response sent by the RACF of the access network to which the mobile UE currently attaches, where the service response carries information that indicates completion of resource admission control on the transport network.

The message sending unit 19012 further includes a service release request unit, which is configured to send a service release request to the S-CSC-FE after receiving the service response.

The S-CSC-FE 1902 is configured to send a resource release request to the RACF of the access network that covers the mobile UE before handover of the mobile UE after receiving the service release request.

Figure 20:
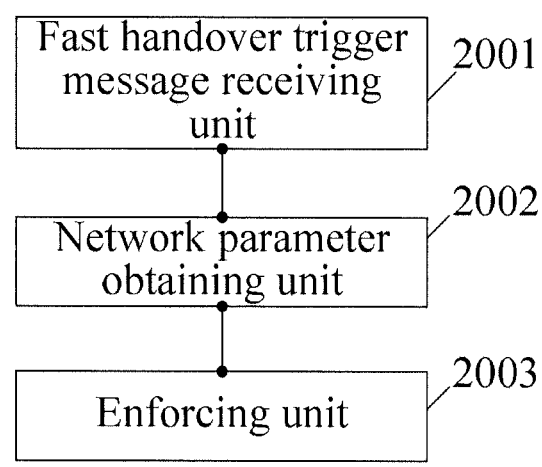
FIG. 20 shows a structure of a resource admission control apparatus provided in Embodiment 17 of the present invention.

As shown in FIG. 20, a resource admission control apparatus provided in Embodiment 17 of the present invention includes:

a fast handover trigger message receiving unit 2001, configured to receive a fast handover trigger message sent by the RACF of the before-handover access network;

a network parameter obtaining unit 2002, configured to obtain network resource parameters of a mobile UE from a RACF of a before-handover access network after receiving the fast handover trigger message; and an enforcing unit 2003, configured to enforce resource admission control on an after-handover transport network according to the obtained network resource parameters of the mobile UE.

A network system provided in Embodiment 18 of the present invention includes:

an NACF, configured to send a resource admission control trigger message to a network resource parameter management element after receiving an authentication request sent by a mobile UE in a moving process;

a network resource parameter management element, configured to send a service request to a RACF after receiving the resource admission control trigger message; and a RACF, configured to enforce resource admission control on the transport network after receiving the service request.

The RACF may be a RACF of the access network to which the mobile UE currently attaches.

The service request may be a resource reservation request that carries the network resource parameters of the mobile UE.

The RACF of the access network to which the mobile UE currently attaches is configured to allocate resources to the transport network to which the mobile UE currently attaches according to the network resource parameters of the mobile UE.

The RACF may be a RACF of the access network to which the mobile UE attaches before handover.

The service request may be a resource release request.

The RACF of the access network that covers the mobile UE before handover is configured to release resources of the transport network that covers the mobile UE before handover after receiving the resource release request.

The network resource parameter management element may be an SCF or a home RACF.

A network system provided in Embodiment 19 of the present invention includes:

a home NACF, configured to send a service request to a RACF after receiving an authentication request sent by a mobile UE in a moving process; and a RACF, configured to enforce resource admission control on the transport network after receiving the service request.

A network system provided in Embodiment 20 of the present invention includes:

a network apparatus in a transport network, configured to send a service request to the RACF after receiving a service access request from the mobile UE; and a, configured to enforce resource admission control on the transport network after receiving the service request.

A network system provided in Embodiment 21 of the present invention includes a target RACF located in a local domain and a source RACF (that is, RACF of the before-handover access network):

The target RACF is configured to: obtain network resource parameters of the mobile UE from the source RACF, and allocate resources to the after-handover transport network according to the obtained network resource parameters of the mobile UE.

In conclusion, the embodiments of the present invention bring the following benefits.

After receiving an authentication request sent by the mobile UE, the network sends a service request to the RACF to correlate mobile user authentication with resource admission control. Therefore, when the mobile UE accesses the network, the network perceives the access of the mobile UE by receiving the authentication request from the mobile UE, and sends a service request to the RACF automatically to trigger the RACF to enforce resource admission control on the transport network, thus speeding up the resource allocation.

After receiving a service access request sent by a mobile UE, the transport network in an embodiment of the present invention triggers a to enforce resource admission control on the transport network, without involving actions of the application layer SCF. The transport network triggers the RACF to enforce resource admission control directly, thus improving the efficiency of resource admission control.

After receiving a service request from a mobile UE, the P-CSC-FE in an embodiment of the present invention triggers a RACF to enforce resource admission control on the transport network. Compared with the prior art, the embodiment of the present invention optimizes the application layer trigger mechanism. In the service request process, the P-CSC-FE intercepts the service request and triggers the RACF to enforce resource admission control on the transport network. By contrast, in the prior art, a Serving Call Session Control Functional Entity (S-CSC-FE) in the SCF triggers the corresponding resource admission control after receiving the service request. Therefore, the embodiment of the present invention optimizes the application layer trigger mechanism provided in the prior art.

When the mobile UE hands over in a local domain, the embodiment of the present invention obtains the network resource parameters of the mobile UE from the source RACF and performs resource allocation for the after-handover transport network. In the prior art, the source RACF needs to release the corresponding transport network resources first, and then the target RACF enforces resource admission control on the current transport network. By contrast, the embodiment of the present invention obtains the network resource parameters of the mobile UE from the source RACF directly, and then allocates resources to the after-handover transport network, thus avoiding the complicated step of resource admission control enforced by the network in the moving process of the mobile UE.

Elaborated above are a resource admission control method, a network apparatus, and a network system under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A network apparatus, comprising a Proxy Call Service Control Function Entity (P-CSC-FE), wherein
the P-CSC-FE comprises:
a service access request receiving unit, configured to intercept a service access request sent by mobile User Equipment (UE) to a Serving Call Session Control Functional Entity (S-CSC-FE), and
a message sending unit, configured to send a service request to a Resource and Admission Control Function (RACF) after intercepting the service access request to trigger the RACF to enforce resource admission control on a transport network;
the RACF is a RACF of an access network to which the mobile UE currently attaches;
the message sending unit comprises a resource reservation request sending unit, which is configured to send a resource reservation request to the RACF after intercepting the service access request;
the P-CSC-FE further comprises a service response receiving unit, configured to receive a service response sent by the RACF, wherein the service response carries information that indicates completion of resource admission control on the transport network;

the message sending unit further comprises a service release request unit, which is configured to send a service release request to the S-CSC-FE after receiving the service response; and the S-CSC-FE is configured to, after receiving the service release request, send a resource release request to a RACF of an access network to which the mobile UE attaches before handover.

* * * * *

UNITED STATES PATENT AND TRADEMARK OFFICE
CERTIFICATE OF CORRECTION

| | | |
|---|---|---|
| PATENT NO. | : 8,483,178 B2 | Page 1 of 1 |
| APPLICATION NO. | : 12/832551 | |
| DATED | : July 9, 2013 | |
| INVENTOR(S) | : Qin Wu et al. | |

It is certified that error appears in the above-identified patent and that said Letters Patent is hereby corrected as shown below:

On the Title Page, Item [75] (Inventors), Column 1, Line 1:

Delete "Zhingang" and insert --Zhigang--, therefor

Signed and Sealed this
Second Day of June, 2015

Michelle K. Lee
*Director of the United States Patent and Trademark Office*